Sept. 22, 1942.　　　F. W. HUNYADY　　　2,296,673
BRAKE MECHANISM
Filed April 14, 1939　　　2 Sheets-Sheet 1
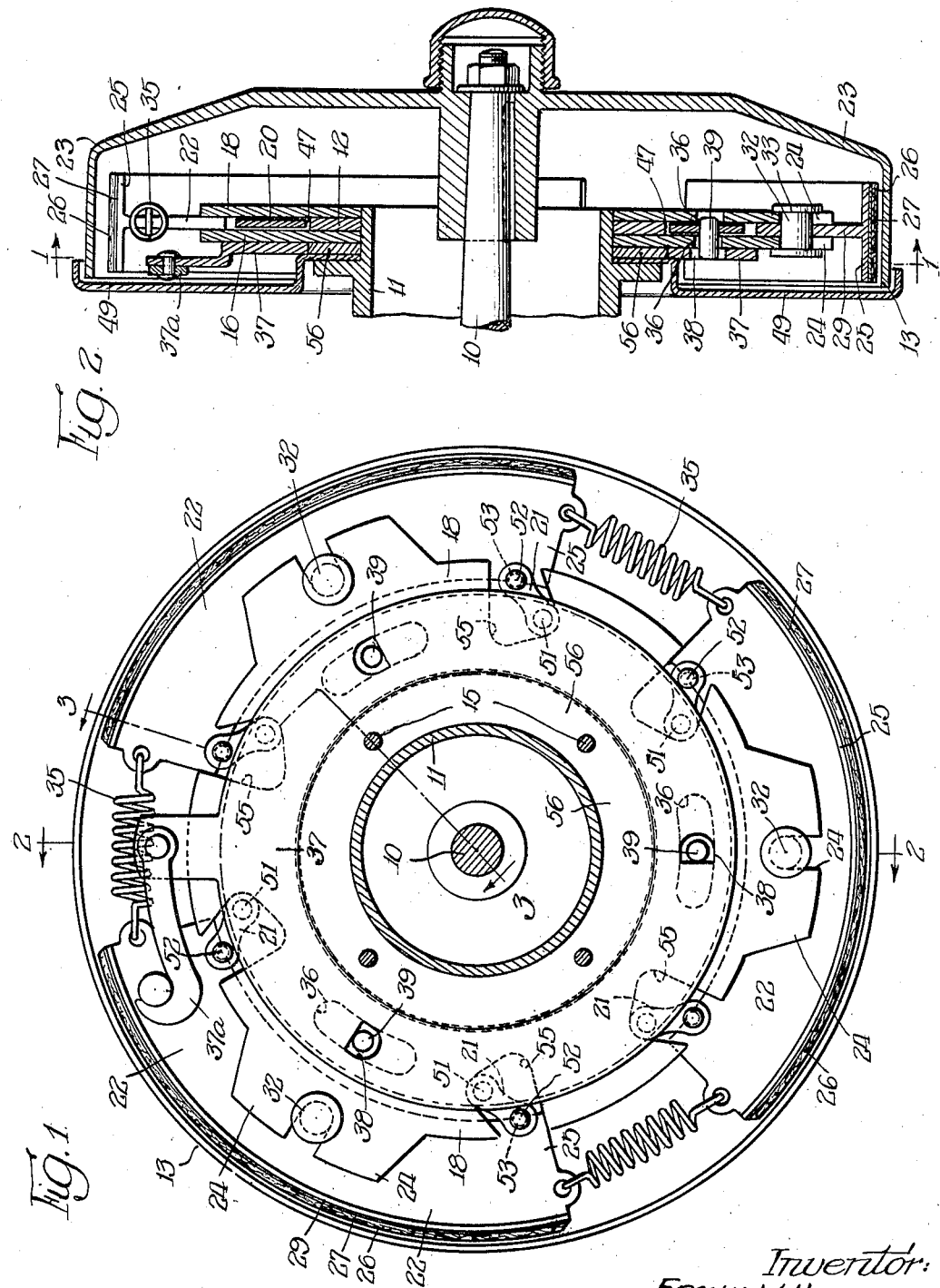
Inventor:
FRANK W. HUNYADY.
By Cromwell, Greist + Warden
attys.

Sept. 22, 1942.    F. W. HUNYADY    2,296,673
BRAKE MECHANISM
Filed April 14, 1939    2 Sheets-Sheet 2
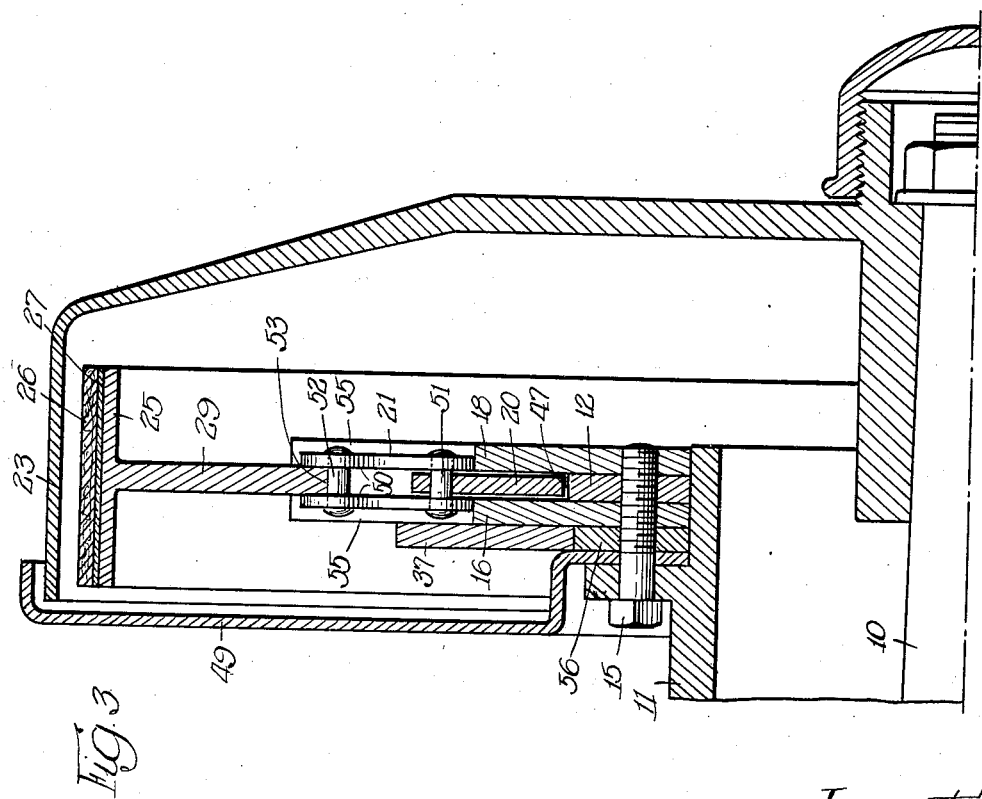
Inventor:
FRANK W. HUNYADY.
By Cromwell, Greist & Warden
Attys.

Patented Sept. 22, 1942

2,296,673

UNITED STATES PATENT OFFICE 2,296,673

BRAKE MECHANISM

Frank W. Hunyady, Chicago, Ill., assignor to F. W. H. Associates, Chicago, Ill., a corporation Application April 14, 1939, Serial No. 267,778

3 Claims. (Cl. 188—78)

The present invention relates to brake mechanism and more particularly to a self-compensating brake mechanism.

In the use of brakes for automobiles it is necessary to apply a sufficient amount of braking power to stop or slow the high powered fast moving automobiles of the present day. No matter how much power is applied to the brakes, if they are not properly adjusted so that the pressure or pull upon the brake elements is substantially equalized among the two or four wheel brakes, there will not be an efficient braking of the wheels. If one wheel receives more pull or power than the other, the brake lining on that wheel will wear rapidly and the application of the brakes will tend to pull the automobile to the side where the most pressure is applied. If one wheel locks there is serious danger of accidents. One advantage of hydraulic brakes has been that this pressure upon all brakes is equalized when the mechanism is working properly and without leaks in the fluid lines.

In the brake mechanisms of today there is also the possibility that the brake shoes are not forced against the braking surface or brake drum equally so that the whole surface of the brake lining is not pressed against the surface simultaneously. Unequal wear and consequent grabbing results from this condition. Moreover, where internal shoes are used for both the parking and foot brakes, the parking brake shoe is usually much smaller than the foot brake shoes, or only one shoe is used for this purpose while two or more are used for the foot brake. As the two brakes are normally used at different times or with different pressures at the same time, there is a tendency to distort the brake drum, making it oval or elongated. The drums themselves are seldom entirely round, and, with this unequal braking pressure applied, they are apt to become so out of line that proper brake efficiency is not attained and new drums must be supplied at no little expense.

This tendency to ovalize the drum is also noted in those instances when the brake shoes are supported against the drums from anchor pins mounted to dust covers or to arms. The pressures received from the circumferential and radial strains of contact with the drum are not directly supported but have a leverage action upon these off-center pins causing them to wear, twist and bend. Contact between the shoes and drums thus becomes unequal and braking efficiency is lessened.

The present invention was made with these various deficiencies in mind and with a view toward remedying the same in mechanical and hydraulic brakes.

One object of this invention is to provide a simple and inexpensive means for self-adjustment of automobile brakes.

Another object of this invention is to provide equal contact between shoes and drum at times when brakes are applied.

A further object of this invention is to provide a floating or equalizing brake surface so that the braking elements will have simultaneous and equal contact with the braking surface when the brakes are applied.

A yet further object of this invention is the application of the advantage of both internal and external brakes to the same brake mechanism.

Still another object of this invention is to provide a direct circumferential and direct mounting for the brake elements to receive the braking strains placed thereon.

Still another object of this invention is to provide an equal pressure contact between each part of the brake shoe lining and its braking surface.

Another object of my invention is to provide a brake mechanism that will wear its linings equally.

Still other and further objects of my invention will be pointed out or indicated hereinafter or will be apparent to one skilled in the art upon an understanding of the invention or its employment in practice.

For aiding in a disclosure of the invention I show in the accompanying drawings forming a part of this specification certain arrangements of parts by reference to which the brake mechanism and its mounting are described. It is to be understood that this description and the drawings are presented for purposes of illustration only and are not to be construed so as to limit the scope of the appended claims unnecessarily.

In the drawings:

Fig. 1 is a side view in elevation of a brake mechanism on the line 1—1 of Fig. 2;

Fig. 2 is a sectional view of a brake mechanism taken on the line 2—2 of Fig. 1;

Fig. 3 is an enlarged detail view taken on the line 3—3 of Fig. 1.

This brake is so constructed that equal pressure is applied to the braking surface and the stresses and strains received by means of the contact between the brake shoes and the braking surface are taken up by direct support so that wear upon the parts is greatly decreased.

This equal pressure may be accomplished by having the brake shoes adjust themselves to the irregularities of the brake drum by "floating" the shoes or causing them to compensate for the difference or it may be attained by having the brake drum, with its irregularities, regulate itself to the brake shoes, thus obtaining proper compensation. In this application various ways of equalizing the braking surface to the braking elements are shown and described.

In Figs. 1 to 3 of the drawing there is shown an axle 10 extending through an axle housing 11. A brake generally identified as 13 includes an annular plate 12 dividing two oppositely disposed bracket plates 16 and 18 from each other. This whole assemblage, with axle openings aligned, is mounted to the axle housing 11, by suitable means such as bolts 15. A cam ring or plate 20 is mounted around the annular plate 12 and between the bracket members 16 and 18. Preferably, the annular plate 12 is slightly thicker than the cam plate so that the latter may be rotated between the bracket plates with ease and without undue friction. A difference in thickness of about .005 of an inch, for example, has been found to be satisfactory.

The cam or link members 21 are formed in connection with the cam or operating ring to force the braking members 22 into contact with the brake drum 23. These link members 21 are formed of small plate members 50 riveted together at their lower end by a pivot rod 51 through the operating ring 20 to form a pivoted connection at that point. At their upper ends the plate members are riveted together by brake actuating bearing rods 52 which abut the inner surface of the supporting webs 29 of the brake shoes. The inner end of the link member 21 is pivoted but must move upon movement of the operating ring 20. Consequently the outer end of the link member or the bearing rod 52 must move upwardly radially against the supporting web 29 forcing the shoe into contact with the drum. The web 29 is cut inwardly at each end to form a housing 53 to receive this bearing rod and to hold it for this purpose.

The bracket plates 18 and 20 should be slotted as at 55 to permit ample movement of the link members 21. Instead of links 21, cam members upon the operating ring as shown in Fig. 4 may be used.

On the bracket plate are formed the guide slot members 24 which assist in guiding the braking members against and away from the brake drum. As shown the braking members include a metal supporting strap 25 for receiving the brake lining 26 which may be separated from the strap 25 by an insulating layer 27 of asbestos or the like. These may be held together by rivets. The insulating layer will assist in preventing the tremendous heat developed by the friction between the brake shoes and drum from being transmitted throughout the brake assemblage and will tend to force the heat into the drum while maintaining the assemblage at a relatively cool temperature.

Beneath the strap member 25 is a supporting web 29 that may have openings or perforations to decrease the weight of the brake and to break up the paths of heat conduction from the shoes to the supporting plates. The inner edge of the supporting web 29 is formed to fit the outer surface of the operating ring 20 and may be so formed that two link members 21 will cooperate with each supporting web. Where this is done it will be found convenient to so form the co-operating supporting webs and operating plate that the braking members 22 are reversible. Thus any mechanic may merely fit the guide pins 32 of the brake shoes into the bracket guide slots 24 and obtain a proper fit between the cam plate 20 and the braking members. The pins 32 may be slotted as at 33 so as to interfit with the sides of the guideways 24 and may be rotatively mounted through the supporting web 29 to lessen friction between pin and guideway.

For purposes of illustration a three segment brake is shown mounted around the central plate. By minor changes two or more braking members may be mounted around or on the central plate and supported thereby. The three segments are joined end to end by the spring elements 35 which return the segments to their full seat upon the cam ring after a braking operation and the release of the cam ring 20.

The operating mechanism as shown is simple and rugged. An annular lever plate 37 having operating openings 38 is rotatively mounted on the outer surface of one of the bracket plates over a bearing plate 56 rigidly mounted to the axle housing 11 by bolt 15. Adjacent these operating openings the bracket plate is slotted at 36 so that the operating or cam ring 20 is immediately beneath. A pin 39 is mounted rigidly within the cam ring and extends through the slot into contact with the lever plate operating openings 38. Upon movement of the lever plate 37, the operating ring is forced to move causing the link members 21 to force the braking surfaces into contact with the drum. A lever plate arm 37a is operatively connected with the foot pedal of the vehicle.

To obtain a full floating or self-equalizing brake the diameter of the central opening through the cam plate 20 may be made slightly larger than the full diameter across the annular plate 12. When concentrically disposed the slot or gap 47 between these two plates may be substantially $\frac{1}{16}$ of an inch in width. This may vary according to the distance that the braking surfaces 26 travel to meet the brake drum surface. Upon application of the brakes, if one of the segments comes into contact with the brake drum before the others, the force of the contact will immediately force the cam ring against the central annular plate 12 thus forcing the other shoes into immediate contact with the drum without jar or response through the lever arm 37a to the operator's hand or foot. The braking surfaces will conform to the surface of the brake drum even through the surface of the latter is uneven, as extra pressure upon one shoe causes the floating movement of the cam plate around the annular plate 12. When this floating brake structure is used, care must be taken to widen the slots 36 and 46 to provide for movement of the pins 39 and 45 with the cam or link ring 20.

All of the plates, supporting members, webs and arms may be made by a simple stamping operation so that the brake assemblage may be made inexpensively. It is entirely supported from the heavy axle housing through the central plate 12 and the braking members are given a direct thrust against the brake drum. The strains and stresses to which the brake is subjected is again received directly back to the axle housing through the central plate so there is direct support throughout.

With this type of brake structure, the dust cover 49 serves no supporting function for the brake and may be made of thin light material further reducing the weight of the whole brake.

As will be seen by the drawings all parts of the brakes may be made of stampings and manufactured cheaply, rapidly and easily by punch press methods.

Various changes and modifications of this invention can be made without departing from the scope of the invention. All such obvious modifications are intended to be included in the appended claims.

I claim:

1. In a brake mechanism, a rotatable member, an annular braking surface mounted thereon, a stationary element disposed centrally within said braking surface, brake surface engaging members mounted around said stationary element, an operating ring mounted around said stationary element and between it and said engaging members but radially spaceable therefrom, lever means associated with said stationary element for circumferential movement with respect thereto and operatively connected with said operating ring, said lever means being supported against radial movement with respect to said operating ring and means on said lever means for permitting radial movement of said operating ring with respect to said lever means.

2. A brake mechanism as defined in claim 1 wherein said lever member comprises an annular member supported against radial movement with respect to said operating ring and said stationary element.

3. A brake mechanism as defined in claim 1 wherein said engaging members are supported from said stationary element for radial movement only.

FRANK W. HUNYADY.